United States Patent
Prais

(10) Patent No.: US 6,260,785 B1
(45) Date of Patent: Jul. 17, 2001

(54) LINE REWINDER APPARATUS

(75) Inventor: Eugene R. Prais, West Milford, NJ (US)

(73) Assignee: Triangle Manufacturing Company, Inc., Upper Saddle River, NJ (US)

( * ) Notice: Subject to any disclaimer, the term of this patent is extended or adjusted under 35 U.S.C. 154(b) by 0 days.

(21) Appl. No.: 09/327,262

(22) Filed: Jun. 7, 1999

(51) Int. Cl.[7] .................................................. B65H 54/00
(52) U.S. Cl. ............................... 242/484.6; 242/390.8; 242/902
(58) Field of Search ................................ 242/487, 484.6, 242/394, 902, 390.8

(56) References Cited

U.S. PATENT DOCUMENTS

| | | |
|---|---|---|
| 3,026,059 | 3/1962 | Dennler . |
| 3,261,569 | 7/1966 | Bedell . |
| 3,312,418 | 4/1967 | Haddock . |
| 3,647,155 | 3/1972 | Jorgenson . |
| 3,679,151 | 7/1972 | Rice . |
| 3,704,840 | 12/1972 | Haddock . |
| 4,007,886 | * 2/1977 | Kaminstein ........................ 242/902 |
| 4,164,332 | * 8/1979 | Insch ................................. 242/902 |
| 4,588,139 | 5/1986 | Lines . |
| 4,795,107 | 1/1989 | Williams . |
| 5,725,172 | * 3/1998 | Koehler et al. .................... 242/902 |
| 5,906,329 | * 5/1999 | Wesley, Sr. ....................... 242/902 |

* cited by examiner

Primary Examiner—Katherine A. Matecki
(74) Attorney, Agent, or Firm—Cummings & Lockwood

(57) ABSTRACT

The subject invention is directed to a reel rewinder apparatus. The apparatus includes a base supporting a drive motor which rotates a drive wheel. A reel foot mounting assembly is mounted to the base and is configured for positioning a reel seat in a predetermined position. Locking assemblies are provided for locking components of the reel seat mounting assembly in a predetermined position. A foot clamping assembly is operatively associated with the reel seat and configured to secure a reel foot thereon. A service spool arm extends from the base and is configured to support a spool in operative relationship with the drive wheel. A support arm assembly is securable to the reel seat with the foot clamping assembly and is used to support a spool against the drive wheel. Alternatively, a spool clamping assembly is incorporated into the drive wheel for clamping a spool to drive wheel.

50 Claims, 11 Drawing Sheets

LINE REWINDER APPARATUS

BACKGROUND OF THE INVENTION

1. Field of the Invention

The subject invention relates generally to an apparatus for winding fishing line onto a fishing reel and, more particularly, to an apparatus for winding fishing line from a supply spool onto either a crank-type reel or a crankless reel.

2. Background of the Related Art

Depending on the condition of a fisherman's fishing line on his/her reel, the fisherman may rewind the line as infrequently as once a year, or as often as once a day. In fact, fisherman that are involved in fishing tournaments will often change the line on as many as ten reels every day during a competition in order to ensure that the line on each reel is in new condition.

Generally, changing line on a fishing reel is a relatively simple operation. If a reel already has line wound onto it, the line must first be removed, or "stripped", from the spool of the reel. After removal, the stripped line is either discarded or recycled. Thereafter, new line is unwound from a supply spool and onto the reel in one of several ways.

Those that change the fishing line on their reels often seek a method to do so that is automated to at least some extent. A number of devices have been developed for automating the rewinding of fishing line from a supply spool to fishing reel spools. The two general categories of such devices may be classified as rod-mounted rewinder devices and table-top rewinder devices.

Examples of rod-mounted rewinder devices are disclosed in U.S. Pat. Nos. 3,026,059; 3,261,569; 3,312,418; and 3,679,151. Each of these devices share the disadvantage of being difficult to assemble and/or awkward to operate. In addition, none of the rod-mounted rewinder devices provide a mechanism for automatically reeling the line onto a fishing reel, therefore, the operator must reel in all of the line from the supply spool to the reel by hand.

Examples of table-top rewinder devices are disclosed in U.S. Pat. Nos. 3,647,155; 3,704,840; 4,588,139; and 4,795,107. The table-top rewinder devices are somewhat of an improvement over the rod-mounted rewinder devices in that they are less awkward to operate and most provide a more mechanized method for winding and unwinding line, for example, by employing a motor drive. However, all but one of the table-top rewinder devices, i.e., U.S. Pat. No. 4,588,139, are limited in that they are capable of rewinding fishing line from a supply spool to only a limited number of reel types. For example, the device of U.S. Pat. No. 3,647,155 is configured to wind line onto a spool of a spinning reel type fishing reel, but it cannot rewind line onto a bait casting type fishing reel. Similarly, the device of U.S. Pat. No. 3,704,840 is configured to wind line onto a spool of a spinning reel type fishing reel, although without requiring that the spool to be detached from the reel.

The device disclosed in U.S. Pat. No. 4,588,139 ("'139 device") provides some improvements over the other table-top rewinding devices, however, it still suffers from certain deficiencies. The '139 device is configured to rewind fishing line from a supply spool onto the spool of either a crank-type reel, for example, a bait casting reel, or crankless reel, for example, a spinning reel spool. The device includes a spindle on a frame for supporting a supply spool in a rotatable position on the frame. A motor-driven rotor is provided on the frame for engaging and winding either a crank-type reel or the spool of a crankless reel. A support member is mountable on the frame alternatively in a first orientation for supporting a crank-type reel or a second orientation for supporting a spool of a crankless reel. Guide elements are provided on the frame for guiding the fishing line from the supply spool onto the respective fishing reel/spool mounted on the frame.

Although the '139 device is capable of rewinding line onto different reel types, it is still deficient in that it does not accommodate various configurations of the different reel types. For example, the '139 device does not accommodate reels having crank handles on different sides of the reel, e.g., left-handed reels vis-à-vis right-handed reels. In addition, the device does not accommodate reels having different heights, i.e., different distances from the foot of a reel to the center of rotation of its crank handle. Furthermore, the '139 device requires several guide elements that inhibit the transfer of, and/or induce fouling/twisting of line that is being fed from the supply spool to a spool of a fishing reel.

In view of the above, there is clearly a need in the art for an improved apparatus for rewinding fishing line from a fishing line supply spool to the multitude of fishing reels types presently available on the market today.

SUMMARY OF THE INVENTION

The subject invention is directed to a reel rewinder apparatus for transferring new fishing line from a storage spool to a fishing reel spool. The reel rewinder apparatus also facilitates the removal of used fishing line from a fishing reel spool to a stripper spool. The apparatus includes a base which supports a drive motor. A shaft extending from the drive motor rotationally supports a drive wheel having a face portion. The drive wheel includes a pair of triangularly shaped apertures extending through the face portion thereof.

A truss is operatively associated with the base and mounted for movement toward and away from, in a direction that is parallel with the axis of rotation of the drive wheel. At least one first locking assembly is adapted and configured to lock the truss in a predetermined position in relation to the base and drive wheel.

A reel bar is operatively associated with the truss and mounted for movement toward and away from the truss in a direction parallel with the face portion of the drive wheel. At least one second locking assembly is adapted and configured to lock the reel bar in a predetermined position in relation to the truss. A reel foot clamping assembly is operatively associated with the reel bar and configured to secure a reel foot to the reel bar.

The reel rewinding apparatus further includes at least one truss shaft mounted to the base. The at least one first locking assembly further includes a collet sleeve mounted on the truss between the truss and the at least on truss shaft. A collet nut is threadingly engaged with the collet sleeve for locking the collet sleeve to the at least one truss shaft.

At least one truss pin is mounted to the truss for guiding the reel bar, wherein the at least one second locking assembly includes a threaded pin that is threadingly engaged with the reel bar for adjustment against the at least one truss pin.

As an alternative to using the at least one first and second locking assemblies, at least on third locking assembly may be used. The third locking assembly is configured to lock the reel bar and the truss in a predetermined position in relation to the base and includes a locking plate pivotally mounted to the truss pin and configured to lockingly engage the truss shaft, and a pin threadingly engaged with the reel bar and adjustable to pivot the locking plate toward the truss shaft.

The reel foot clamping assembly includes at least one angled bracket mounted for movement along the length of the reel bar. The angled bracket includes a pair of flanges that straddle the reel bar. A clevis pin extends between flanges to capture the angled bracket to the reel bar.

The reel rewinder apparatus further includes a service spool arm extending from the base and configured to support a spool in operative relationship with the drive wheel. The service spool arm is relocatable between a left-hand position and a right-hand position to facilitate transferring fishing line onto the spools of various fishing reel types.

A support arm assembly is included and has a reel foot that is securable to the reel bar with the reel foot clamping assembly. The support arm assembly is operatively configured to support a spool against the face portion of the drive wheel.

As an alternative to using the support arm, the drive wheel may include a spool clamping assembly operatively configured for clamping a spool to its face portion. The spool clamping assembly includes a spindle that is rotatably mounted to the drive wheel. The spindle has a left-hand thread on a first end and a right-hand thread on a second end. A first jaw is threadingly engaged with the left-hand thread of the spindle and a second jaw threadingly engaged with the right-hand thread of the spindle. The drive wheel further includes a traveler guide and the first and second jaws each include a traveler for mating with the traveler guide.

These and other features of the present invention will become more apparent to those skilled in the art upon inspection of the following detailed description read in conjunction with the attached figures.

BRIEF DESCRIPTION OF THE DRAWINGS

So that those of ordinary skill in the art to which the subject invention pertains will more readily understand how to make and use the reel line rewinder described herein, preferred embodiments of the invention will be described in detail with reference to the drawings, wherein.

DETAILED DESCRIPTION OF THE PREFERRED EMBODIMENTS

Reference is now made to the accompanying figures for the purpose of describing, in detail, the preferred embodiments of the present invention. The figures and accompanying detailed description are provided as examples of the invention and are not intended to limit the scope of the claims appended hereto. Like elements in each of the figures are identified with like numbers.

The present invention provides a novel and unique apparatus for winding fishing line onto spools of various fishing reel types, for example, bait casting reels, fly reels, and spinning reels. The line rewinder apparatus, illustrated in FIG. 1 and identified generally at 10, is advantageously configured to be highly portable, however, many of the below-described attributes may also be incorporated into a stationary system.

Figure 1:
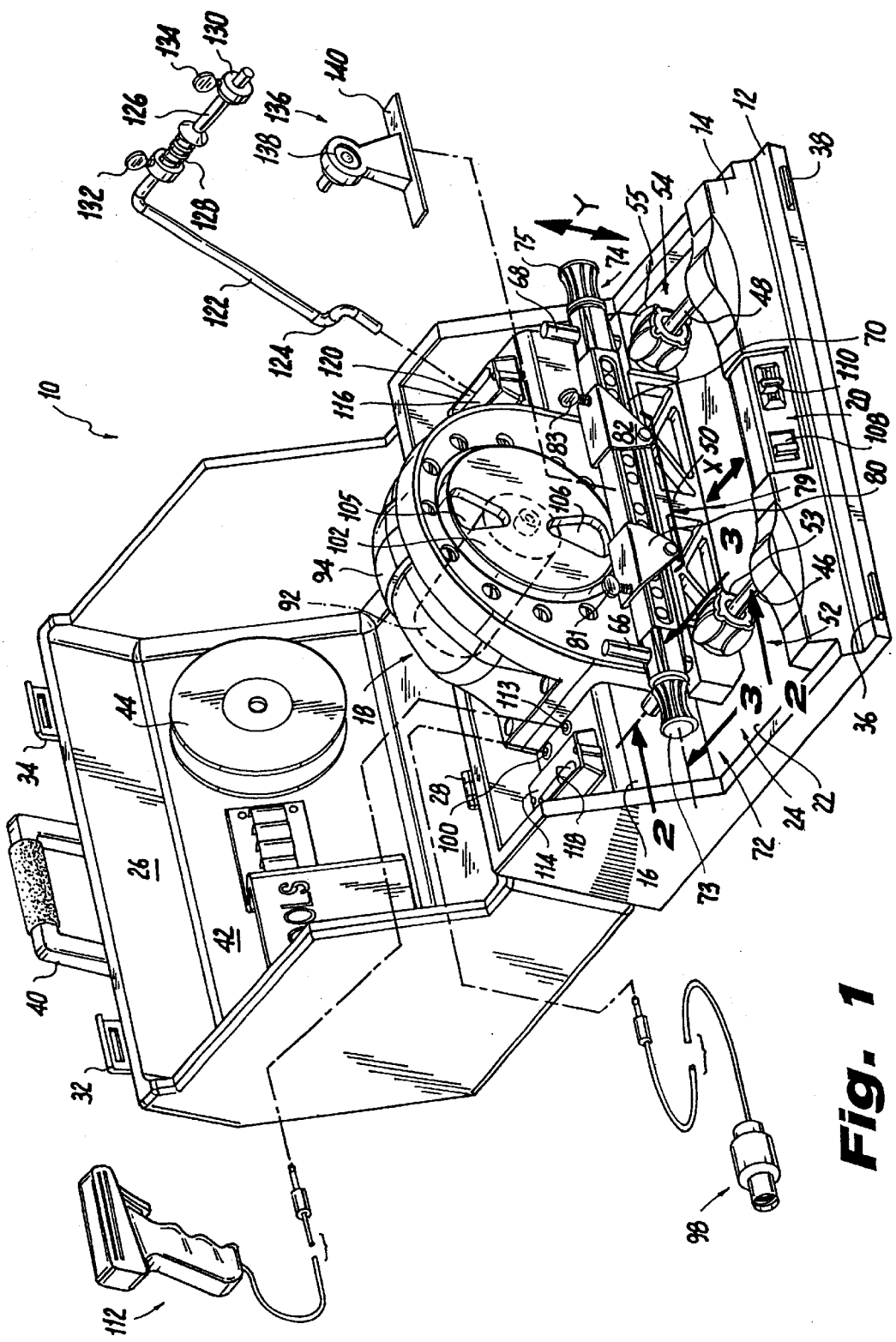
FIG. 1 is a perspective view of a preferred embodiment of a line rewinder apparatus.
Figure 7:
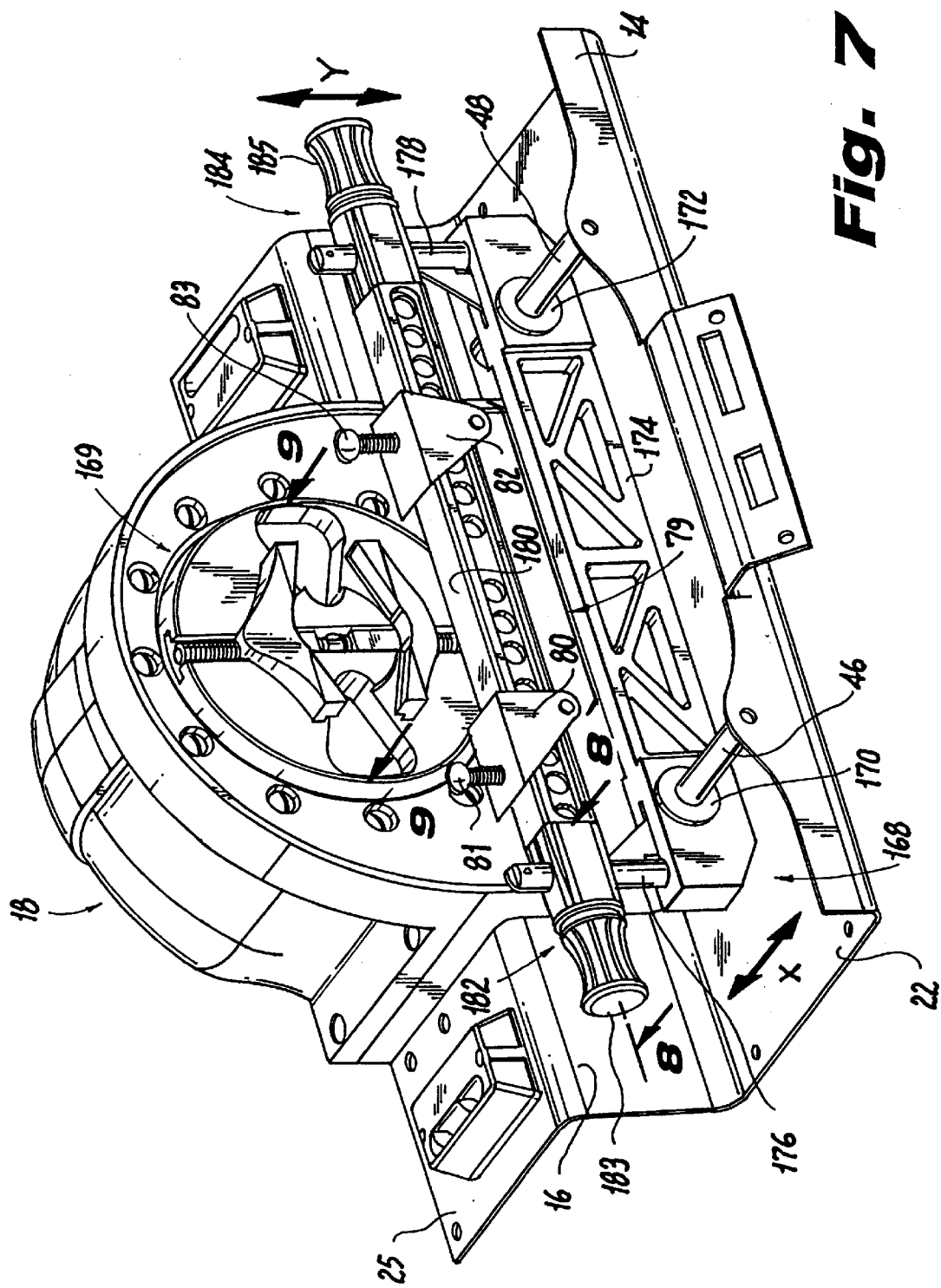
FIG. 7 is a perspective view of a preferred embodiment of a line rewinder apparatus, wherein a reel rewinder insert is disassembled from the base.

The line rewinder apparatus 10 may be used, for example, by professional fisherman during fishing tournaments where the need to quickly strip and fill dozens of reel spools during a fishing tournament is imperative in order to be competitive. In addition, the line rewinder apparatus 10 may be used in a bait and tackle shop to strip and/or fill reel spools for customers in the normal course of business. Furthermore, the line rewinder apparatus 10 may be used by recreational fisherman at home or in the field to strip and/or fill their reel spools. Referring Referring to FIG. 1, the line rewinder apparatus 10 includes a base 12 having a front raised portion 14 extending across the front of the base 12 and a rear raised portion 16 extending across the rear of the base 12. Between the front raised portion 14 and the rear raised portion 16 is defined a well 22. Those skilled in the art will recognize that a sheet metal insert 25 can be used to form a substantial portion of the front raised portion 14, rear raised portion 16, and well 22; thereby providing a structurally rigid frame to which the major components of the line rewinder apparatus 10 can be attached (FIG. 7).

Mounted between the front raised portion 14 and the rear raised portion 16 is a reel foot mounting assembly 24. Attached to the center of the rear raised portion 16 is a drive assembly 18 which is configured to drivingly rotate reels or spools. The reel foot mounting assembly 24 is used to accurately position a reel in relation to the drive assembly 18 and can also be used to position a spool in relation to the drive assembly 18. Attached to the center of the front raised portion 14 is a control panel 20, wherein various controls are located for operating the drive assembly 18. The drive assembly 18, control panel 20, reel foot mounting assembly 24 are described in more detail herein below.

Figure 4:
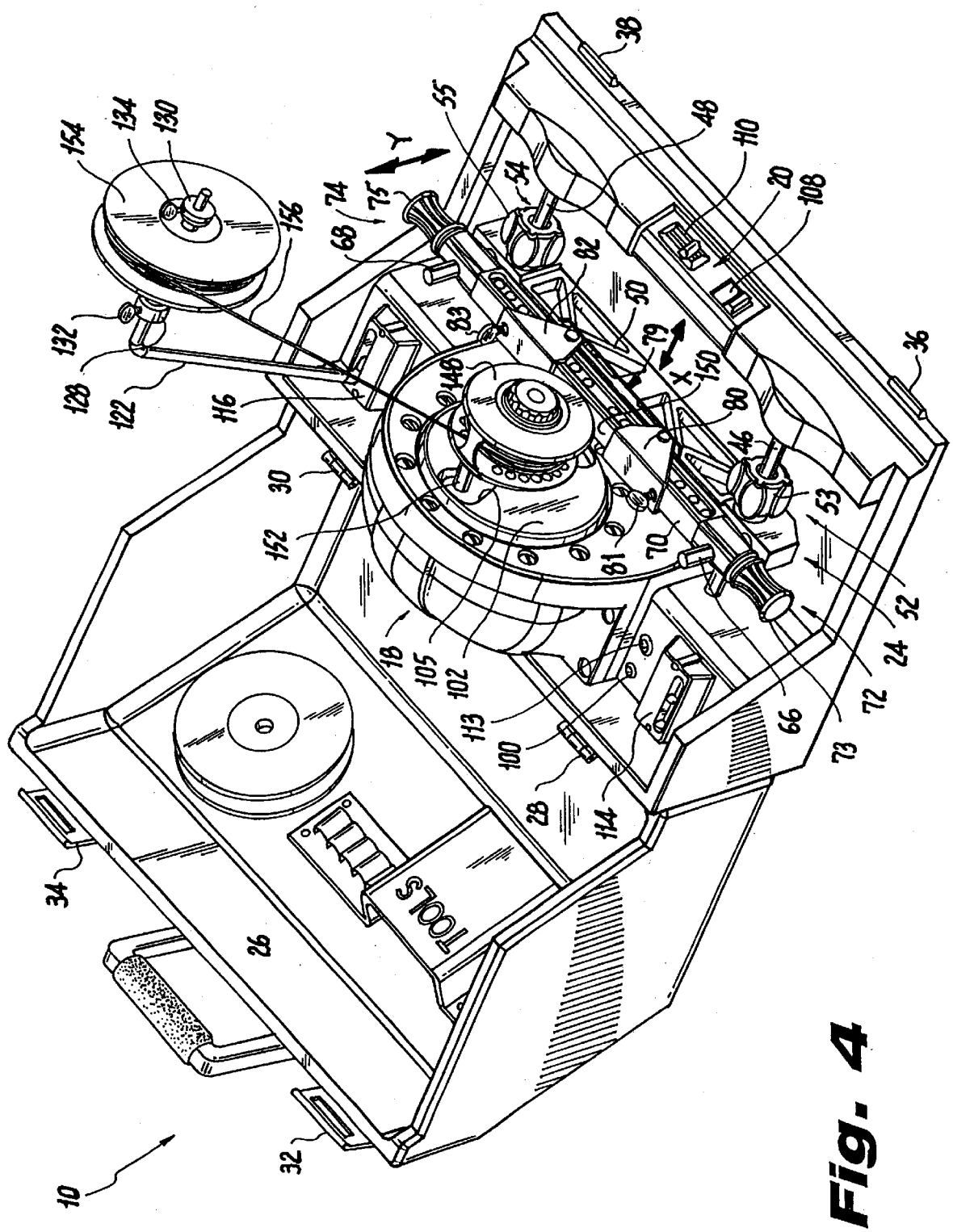
FIG. 4 is a perspective view, similar to FIG. 1, of a preferred embodiment of a line rewinder apparatus with a fly reel mounted thereon for rewinding new fishing line from a supply spool to the spool of the fly reel.

A cover 26 is configured to swing between an open position and closed position. The cover 26, shown in the open position, is hingedly attached to the rear raised portion 16 of the base 12 with a pair of hinges 28 and 30 (FIG. 4). The hinges 28 and 30 may be of the type permitting the cover 26 to be separated from the remainder of line rewinder apparatus 10. This facilitates use of the line rewinder apparatus 10 by requiring the availability of less surface area for its operation. When the cover 26 is in the closed position, all of the major components and assemblies including, for example, the drive assembly 18, control panel 20, and reel foot mounting assembly 24, are enclosed and protected from the elements. This is particularly advantageous during transport and storage of the line rewinder apparatus 10.

Enclosure clips 32 and 34 extend from the open edge of the cover 26, opposite the edge to which hinges 28 and 30 are attached. Enclosure clips 32 and 34 are configured to capture tabs 36 and 38, respectively, which extend from a front edge of base 12, when the cover 26 is swung into the closed position. A handle 40 is attached to the outside of the cover 26 to facilitate carrying the line rewinder apparatus 10 during transport. A storage compartment 42 is provided within the cover 26 to store, for example, service tools (not shown) and a stripper spool 44.

The reel foot mounting assembly 24 includes a pair of truss shafts 46 and 48 spanning the well 22 in parallel relationship to each other between the front and rear raised portions, 14 and 16, respectively. A truss 50 adjustably moves on the truss shafts 46 and 48 toward and away from the drive assembly 18 as indicated by double-headed arrow "X". Locking assemblies 52 and 54 function as bushings and locking devices for guiding and locking truss 50 on truss shafts 46 and 48, respectively. Locking assembly 52 includes collet nut 53 and locking assembly 54 includes collet nut 55 for locking the truss 50 to truss shafts 46 and 48, respectively, as will be described in more detail herein below. Both locking assemblies 52 and 54 are identical in design and function, therefore only locking assembly 52 is described below.

Figure 2:
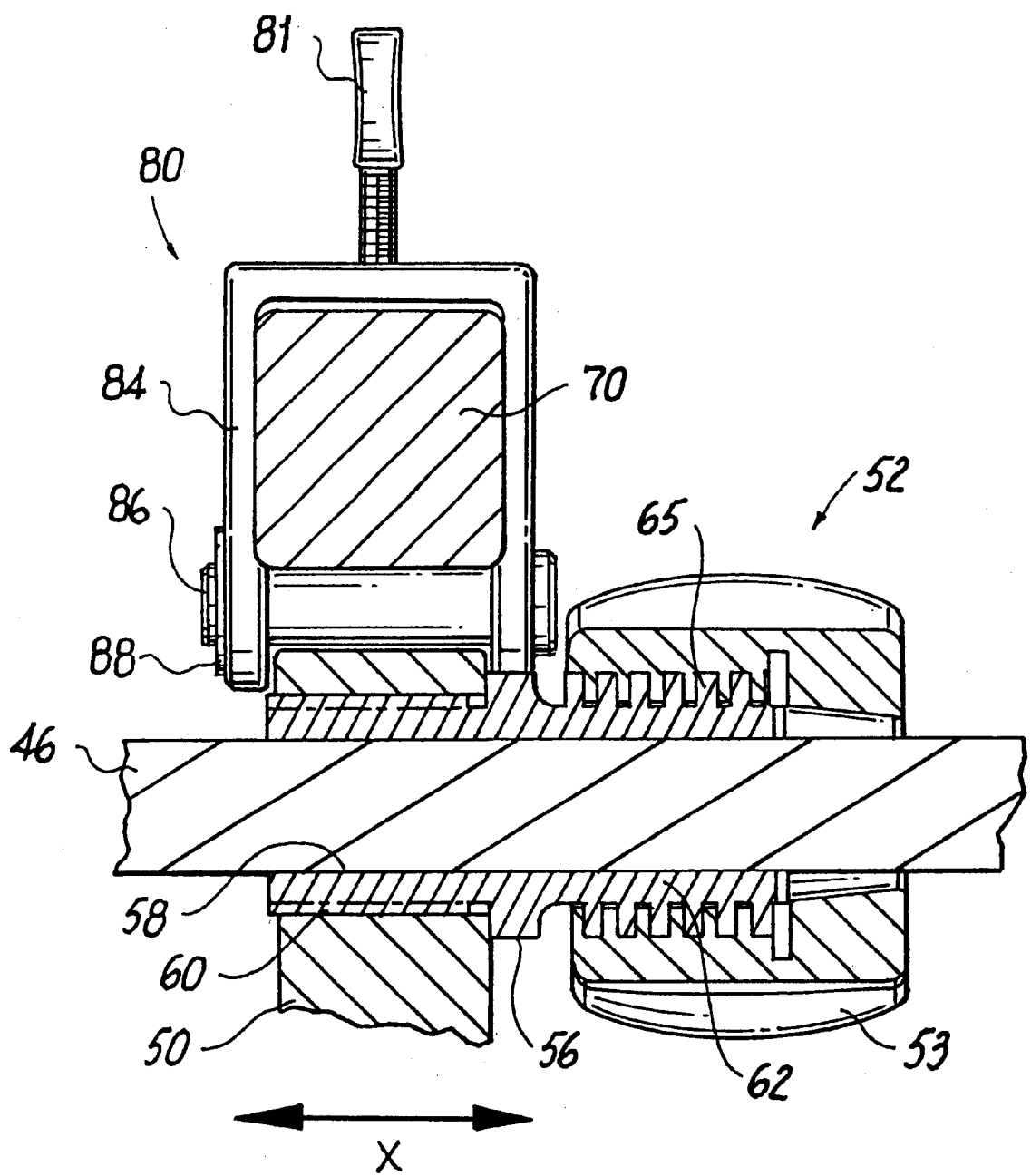
FIG. 2 is a partial sectional view, taken along line 2—2 of FIG. 1, showing the details of a locking assembly and a clamping assembly.

Referring to FIG. 2, locking assembly 52 includes a collet sleeve 56 having an axial bore 58 extending through its length. The collet sleeve 56 includes an external thread 60 at a first end of the collet sleeve 56 so it may be threadingly secured to truss 50. At least the first end portion of axial bore 58 is bored to be only slightly larger than the outside diameter of truss shaft 46 so that collet sleeve 56 will slide smoothly thereon.

The collet sleeve 56 further includes a collet portion 62 at a second end of the collet sleeve 56 so it may grip truss shaft 46. The collet portion 62 includes several longitudinal slits which form semicircular fingers (not shown) as is well known by those skilled in the art. The collet nut 53 is threadingly engaged with the collet portion 62 for tightening the semicircular fingers of the collet portion 62 against the outer diameter of the truss shaft 46, for example, through a tapered acme-type thread 65.

Referring to FIG. 1 truss pins 66 and 68 each extend from an end of truss 50 and are in parallel relationship with each other. A reel bar 70 is guided by truss pins 66 and 68 in the vertical direction as indicated by double-headed arrow "Y". Locking assemblies 72 and 74 function as locking devices for locking reel bar 70 to truss pins 66 and 68, respectively. Locking assembly 72 includes locking knob 73 and locking assembly 74 includes locking knob 75 for locking the reel bar 70 to the truss pins 66 and 68, respectively. Both locking assemblies 72 and 74 are identical in design and function, therefore only locking assembly 72 is described in detail below.

Figure 3:
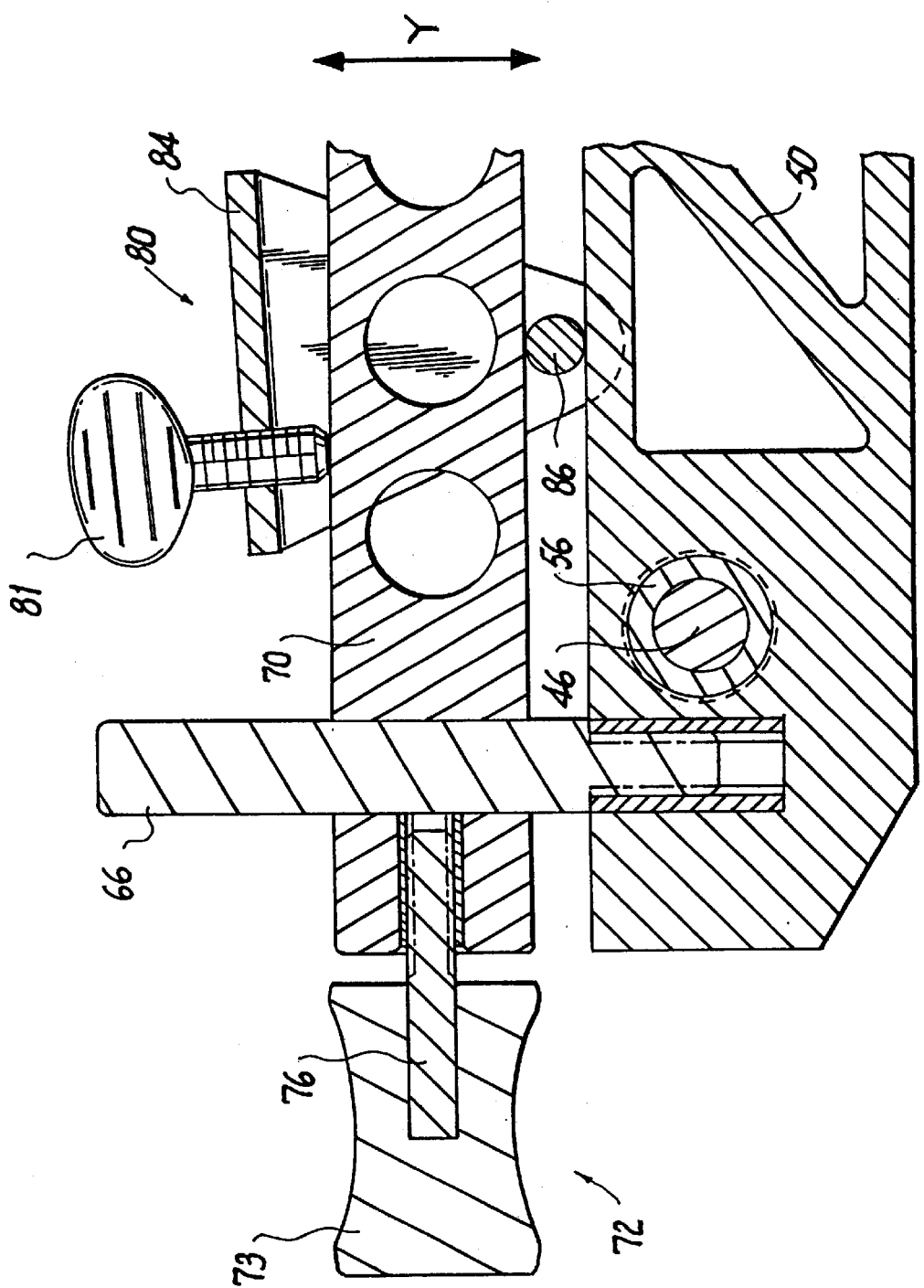
FIG. 3 is a partial sectional view, taken along line 3—3 of FIG. 1, showing the details of a locking assembly and a clamping assembly.

Referring to FIG. 3, locking assembly 72 includes a threaded pin 76 attached to the locking knob 73. Threaded pin 76 threadingly engages an end of reel bar 70 and can contact the outer diameter of truss pin 66 to lock the reel bar 70 in a predetermined position in relation to the truss 50.

Those skilled in the art will recognize that a preferred embodiment of the present invention includes substituting locking assemblies 52 and 54 for locking assemblies 72 and 74, and visa versa. More specifically, locking assemblies 52 and 54 may be used to guide and lock reel bar 70 on truss pins 66 and 68, respectively, and locking assemblies 25 72 and 74 may be used to lock truss 50 on truss shafts 46 and 48, respectively. In addition, either of the locking assemblies can be used to lock, or guide and lock, both the reel bar 70 on truss pins 66 and 68 and truss 50 on truss shafts 46 and 48. Furthermore, other preferred embodiments may use other types of locking and/or guiding assemblies without departing from the spirit and scope of the present invention. One such embodiment is described in detail herein below with reference to FIGS. 7 and 8.

Referring to FIG. 1, a foot clamping assembly 79 includes a pair of foot clamps 80 and 82 which are provided to secure a foot of a fishing reel to the reel bar 70. Foot clamp 80 includes thumb screw 81 and foot clamp 82 includes thumb screw 83. Both foot clamps 80 and 82 are identical in design and function, therefore only foot clamp 80 is described in detail herein below.

Referring to FIGS. 2 and 3, foot clamp 80 includes an angled bracket 84 having two flanges that straddle and extend below the lower portion of reel bar 70. A clevis pin 86 extends between the two flanges of the angled bracket 84 and is secured in place with an E-ring 88. The clevis pin 86 captures the angled bracket 84 to reel bar 70 and permits the angled bracket 84 to slide along the length of reel bar 70. Thumb screw 81 is threaded into a top portion of angled bracket 84 for tightening against the top surface of reel bar 70, thereby securing a portion of a reel foot to the reel bar 70.

Those skilled in the art will recognize that other foot clamping assemblies may be utilized in an embodiment of the line rewinder apparatus 10 which would be in keeping with the spirit and scope of the present invention. For example, retaining elements 46 and 47 which are disclosed in U.S. Pat. No. 4,588,139, the disclosure of which is incorporated herein by reference, may be utilized for securing the foot of a reel to reel bar 70. Additional examples of foot clamping assemblies that may be utilized in an embodiment of the line rewinder apparatus 10 include those found on any commercially available fishing reels.

Figure 1A:
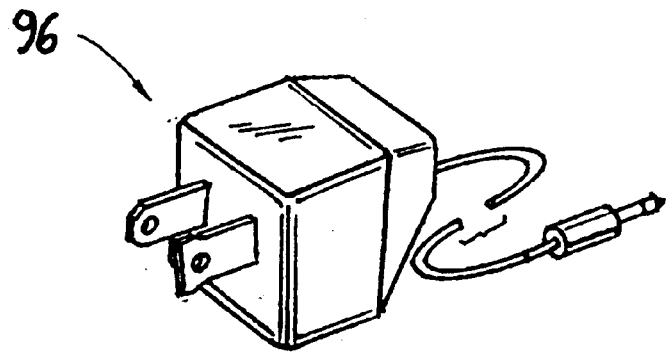
FIG. 1A is a perspective view of an adapter that may be used to provide power to the line rewinder apparatus shown in FIG. 1.
Figure 5:
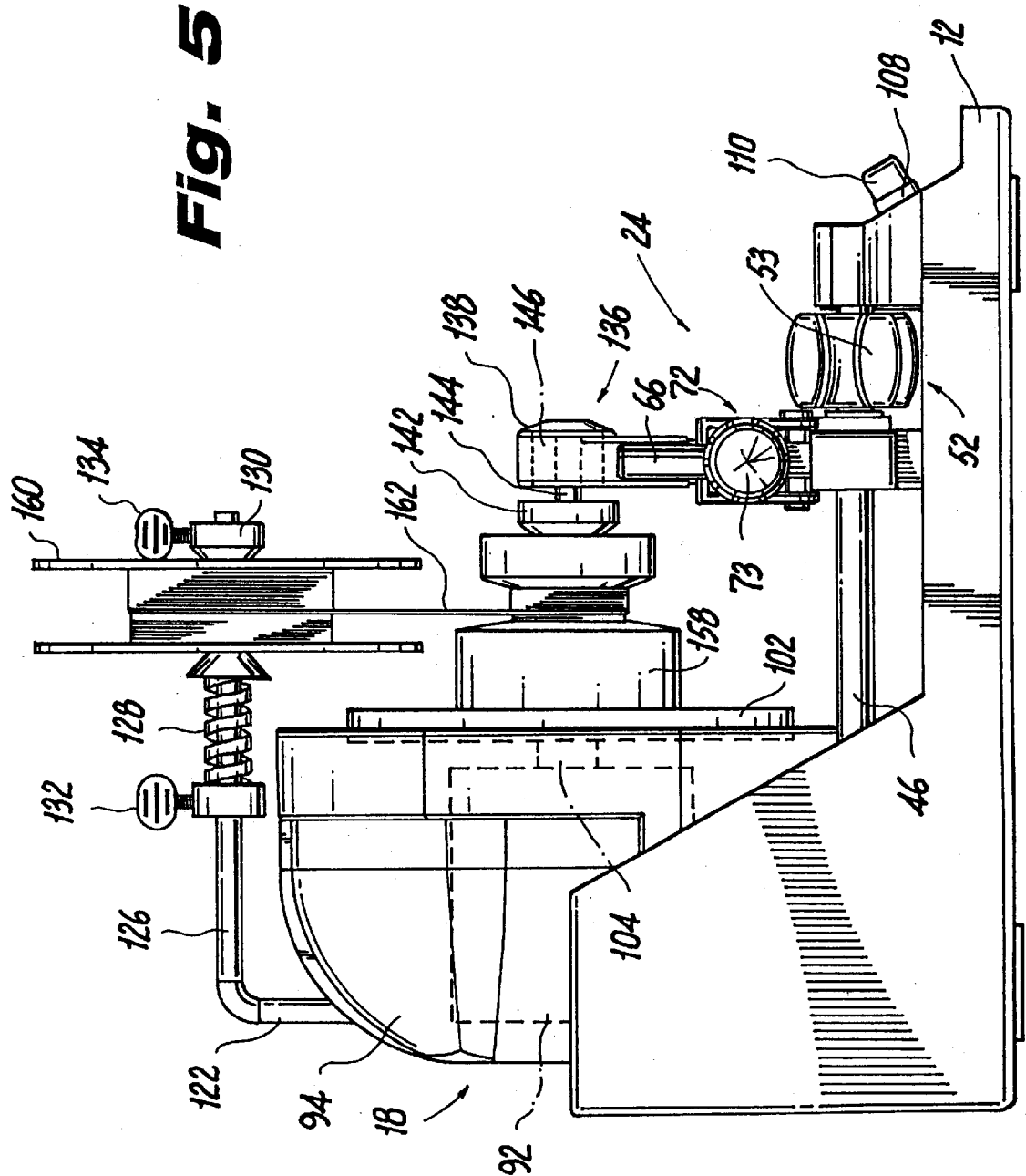
FIG. 5 is a side elevation view of a preferred embodiment of a line rewinder apparatus with its cover removed and showing a spinning reel spool mounted thereon for rewinding new fishing line from a supply spool to the spinning reel spool.

Referring to FIGS. 1 and 5, the drive assembly 18, as described above, is configured to engage and rotate reels or spools. The drive assembly 18 includes a motor 92 mounted within a motor housing 94. Electrical power may be supplied to the motor 92 by a variety of ways well known in the art. Referring to FIG. 1A for example, a transformer adapter 96 may be employed to provide power to the motor from a standard 115 VAC outlet. Alternatively, a cigarette lighter adapter 98 may be employed to provide power to the motor 92 from a standard 12 VDC automobile lighter as shown in FIG. 1. Power connector 100 is included to facilitate the connection of such adapters. In addition, a rechargeable battery pack (not shown) may be incorporated into the line rewinder apparatus 10 to facilitate stripping or winding line on a reel or spool in a location where electrical power is unavailable.

A drive wheel 102 protrudes through an opening in the motor housing 94 and is attached to a drive shaft 104 of motor 92. The exposed face of the drive wheel 102 is textured or includes a non-slip surface, for example, cork or rubber, to facilitate driving spools in a manner as described below. The drive wheel 102 also includes triangularly shaped apertures 105 and 106 for engaging handles of fishing reels. Those skilled in the art will recognize that other aperture geometries, for example, ovals, elongated holes, etc., may be used to accept various types of fishing reel handles available on the market. Those skilled in the art will also recognize that other methods may be used to engage fishing reel handles, for example, removable dowel pins, clips, etc.

The controls of panel 20 are used to control the rotational direction and speed of the motor 92. Switch 108 is a rocker switch having, for example, three positions including off, forward, and reverse. Switch 110 is a dimmer switch controlling the rotational speed of the motor 92 from zero (0) revolutions per minute ("r.p.m.") to a predetermined maximum r.p.m.

Figure 1B:
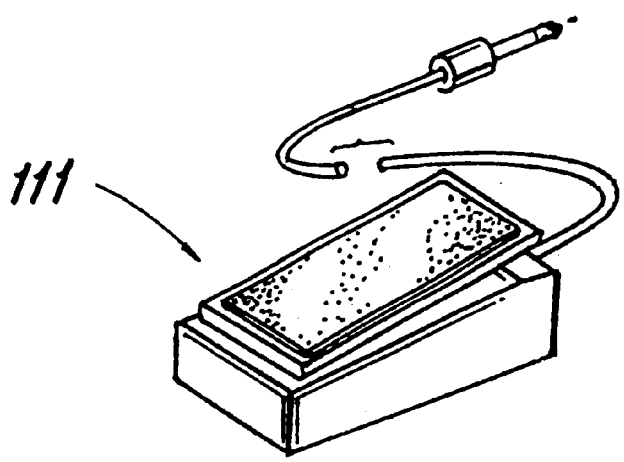
FIG. 1B is a perspective view of a controller that may be used to remotely control the speed and rotational direction of the line rewinder apparatus shown in FIG. 1.

Referring to FIG. 1B, rotational speed of the motor 92 may also be controlled remotely, for example, by using a foot pedal controller 111, thereby, for example, leaving the operator's hands free to tend to manipulating the lay of the line on a spool as it is being wound thereon. In addition, rotational speed of the motor 92 may be controlled remotely by using a hand held trigger-type controller 112 as shown in FIG. 1. The foot pedal controller 111 and the hand held controller 112 can include both forward and reverse controls. A control connector 113 is provided proximate the power connector 100 for connecting remote control devices to the line rewinder apparatus 10.

Referring to FIG. 1, arm mounts 114 and 116, which include keyed slots 118 and 120, respectively, are secured to the upper surfaces of the rear raised portion 16. A service spool arm 122 for supporting line spools of various sizes includes an S-shaped end 124 for readily engaging keyed slots 118 or 120 of arm mounts 114 or 116, respectively. The arm mount, 114 or 116, to which the service spool arm 122 is to be engaged depends on the type of fishing reel on which line is to be wound. This depends on, for example, whether a fishing reel is of the type mounted to the top or bottom of a rod, whether a fishing reel is of the type configured for a right-handed or left-handed fisherman, etc.

Referring to FIGS. 1 and 5, the service spool arm 122 also includes a 90° bend 126 on the end opposite the S-shaped end 124 and lying in approximately the same plane therewith. Bend 126 includes a spring type cone 128 and a straight cone 130 slidably mounted thereon. The collar of spring type cone 128 has a radially extending threaded hole which includes a thumb screw 132 threaded therein for securing the collar to the 90° bend 126. The collar of straight cone 130 also has a radially extending threaded hole which includes a thumb screw 134 threaded therein for securing the collar to 90° bend 126. The cones of the spring type cone 128 and straight cone 130 center and support spools that are attached to the service spool arm 122 for stripping and winding line. The spring molded into spring type cone 128 facilitates, when partially compressed, the application of a small axial force against the inner rim of the supported spools when assembled to the service spool arm 122. The axial force acts as a line-tension regulator and prevents an attached spool from free-spooling when the motor 92 is decelerating.

A support arm assembly 136 is included to support, for example, spinning reel type spools and the stripper spool 44 against the face of drive wheel 102. Support arm assembly 136 includes a bearing housing 138 from which a reel foot 140 extends. The reel foot 140 is similar to those found on fishing reels and is used to facilitate attaching the support arm assembly 136 to the reel bar 70 with foot clamps 80 and 82 of foot clamping assembly 79. A bearing 146 is supported in bearing housing 138. The bearing 146 is of the type capable of supporting primarily thrust loads. An idler shaft 144, having a centering cone 142 attached thereto, is pressed into the inner race of bearing 146. Centering cone 142 may be made of a resilient material such as nitrile rubber and molded onto idler shaft 144.

Operation of the line rewinder apparatus 10 is described below. For the description that follows, references that are made to the rotational direction of a spool are from the viewpoint of one facing the front of the line rewinder apparatus 10, or in other words, facing the exposed face of drive wheel 102. In addition, "counter clockwise" is referred to as "CCW" and "clockwise" is referred to as "CW".

Referring to FIG. 4, to operate the line rewinder apparatus 10, it is first placed on a solid table or surface for support. The enclosure clips 32 and 34 are unclipped from tabs 36 and 38, respectively, and the cover 26 is swung open to expose the various components and assemblies including, for example, the drive assembly 18, control panel 20, and reel foot mounting assembly 24. If the hinges 28 and 30 are of the type permitting the cover 26 to be separated from the remainder of the line rewinder apparatus 10, the cover 26 may be removed and placed to the side.

Electrical power is supplied by plugging either the transformer adapter 96 or cigarette lighter adapter 98 into the power connector 100 and to the appropriate outlet type. Alternatively, a rechargeable battery pack may be utilized if one is incorporated into the line rewinder apparatus 10 and is fully charged. If it is desirable to remotely control the speed of motor 92, the foot pedal controller 111 or hand-held controller 112 is plugged into the control connector 113 of the line rewinder apparatus 10.

To rewind new fishing line onto a fly reel 148, collet nuts 53 and 55 of locking assemblies 52 and 54, respectively, are loosened and the truss 50 is moved in the X direction away from the drive assembly 18. The thumb screws 81 and 83 of foot clamps 80 and 82, respectively, are loosened and the foot clamps 80 and 82 are moved laterally outward away from the center of reel bar 70. The reel foot 150 of fly reel 148 is centered on top of reel bar 70 with its handle 152 facing toward the drive assembly 18. The foot clamps 80 and 82 are moved laterally inward toward the fly reel 148 to capture each extended portion of the reel foot 150. Thumb screws 81 and 83 are tightened to secure fly reel 148 in place.

With fly reel 148 secured to the center of reel bar 70, the reel foot mounting assembly 24 is adjusted so the handle 152 of fly reel 148 is drivingly engaged with drive wheel 102. To ensure that the fly reel 148 rotates at constant angular velocity, thereby ensuring line is evenly wound onto its spool, the axis of rotation of handle 152 is made as nearly congruent as possible with the axis of rotation of drive wheel 102. Because the axis of rotation of handle 152 is congruent with the axis of rotation of the spool of fly reel 148 (as is typical with fly-type fishing reels), the axis of rotation of the spool of fly reel 148 is also congruent with the axis of rotation of drive wheel 102.

Those skilled in the art will recognize that other types of reels, for example, most bait casting reels, include handles having axes of rotation which are offset from the axes of rotation of the spool of the associated reel. This is because of the various types of spool-drive gearing systems that are employed to facilitate easier line reeling. In such cases, the spool of the associated reel will not be aligned with the axis of rotation of the drive wheel 102 when the reel is properly installed on the reel bar 70 of the line rewinder apparatus 10. Instead, the axis of rotation of the handle will be made congruent with the axis of rotation of the drive wheel 102 by using the adjustment mechanisms of the reel foot mounting assembly 24 as described herein. The ability to infinitely adjust the reel foot mounting assembly 24 to accommodate a multitude of reel configurations illustrates one of the unique and novel aspects of the present invention.

To adjust fly reel 148 so handle 152 is drivingly engaged with drive wheel 102, locking knobs 73 and 75 of locking assemblies 72 and 74, respectively, are loosened and the reel bar 70 is moved in the Y direction so that the axis of rotation of handle 152 is as nearly congruent as possible with the axis of rotation of drive wheel 102. The locking knobs 73 and 75 are then tightened against truss pins 66 and 68, respectively, to retain the vertical position of the reel bar 70.

Thereafter, the truss 50 is moved in the X direction toward the drive assembly 18 until the handle 152 of fly reel 148 sufficiently passes into an aperture, for example, aperture 105, of drive wheel 102 so that the handle 152 is drivingly engaged with drive wheel 102. The collet nuts 53 and 55 of locking assemblies 52 and 54, respectively, are tightened to secure the truss 50 in position.

Assuming the fly reel 148 is to be used on a fly rod by a right-handed fisherman, the service spool arm 122 is installed in arm mount 116 and a spool 154 of new fishing line 156 is mounted on the service spool arm 122 for unreeling in the CCW direction. Of course, if the fly reel 148 is to be used on a fly rod by a left-handed fisherman, the service spool arm 122 would be installed in arm mount 114 and the spool 154 of new fishing line 156 would be mounted on the service spool arm 122 for unreeling in the CW direction. Spool 154 is aligned with the spool of fly reel 148 by adjusting spring type cone 128 and straight cone 130 against the inner rim of spool 154. The free end of new fishing line 156 s tied to the spool of fly reel 148 in preparation for winding the new line thereon.

To rewind the new fishing line 156 from the spool 154 onto the spool of the fly eel 148, switch 108 is switched to the "reverse" position, i.e., for CCW rotation, and switch 110 is adjusted to rotate the drive wheel 102 at the desired rotational speed. As new fishing line 156 is reeled onto the spool of fly reel 148, it may be guided either by hand or with a tool (not shown) to ensure even disbursement thereon.

Referring to FIGS. 1 and 5, to rewind fishing line onto a spool 158 of a spinning reel, collet nuts 53 and 55 of locking assemblies 52 and 54, respectively, are loosened and the truss 50 is moved in the X direction away from the drive assembly 18. The thumb screws 81 and 83 of foot clamps 80 and 82, respectively, are loosened and the foot clamps 80 and 82 are moved laterally outward away from the center portion of the reel bar 70. The reel foot 140 of support arm assembly 136 is centered on top of reel bar 70 with its centering cone 142 facing toward the drive assembly 18. The foot clamps 80 and 82 are moved laterally inward toward the support arm assembly 136 to capture each extended portion of the reel foot 140. Thumb screws 81 and 83 are tightened to secure the support arm assembly 136 in place.

With support arm assembly 136 secured to reel bar 70, locking knobs 73 and 75 of locking assemblies 72 and 74, respectively, are loosened and the reel bar 70 is moved in the Y direction so that the axis of rotation of centering cone 142 is congruent with the axis of rotation of drive wheel 102. The locking knobs 73 and 75 are tightened against truss pins 66 and 68, respectively, to retain the vertical position of the reel bar 70.

With spool 158 held in place (by hand) against the face of drive wheel 102 as shown in FIG. 5, truss 50 is moved in the X direction toward the drive assembly 18 until the centering cone 142 of support arm assembly 136 contacts an inner rim of spool 158. The collet nuts 53 and 55 of locking assemblies 52 and 54, respectively, are tightened to secure the truss 50 in position.

Spool 158 is to rotate in the CCW direction for installation of new fishing line, therefore the service spool arm 122 is installed in arm mount 116 and a spool 160 of new fishing line 162 is mounted on the service spool arm 122. Spool 160 is aligned with spool 158 by adjusting spring type cone 128 and straight cone 130 against the inner rim of spool 160. The free end of new fishing line 162 is tied to spool 158 in preparation for winding the new line thereon.

It should be readily apparent to those skilled in the art that spools from certain other types of spinning reels, wherein the bail and reeling mechanisms wind the line onto the spool in the opposite direction, would require the spool to be rotated in the CW direction on the line rewinder apparatus 10. In such cases, the line would be more easily wound onto the spool by installing service spool arm 122 in arm mount 114 and mounting spool 160 onto service spool arm 122 so that new fishing line 162 feeds off of spool 160 as it rotates in the CW direction.

To rewind the new fishing line 162 from spool 160 onto spool 158, switch 108 is switched to the "reverse" position, i.e., for CCW rotation, and switch 110 is adjusted to rotate the drive wheel 102 at the desired rotational speed. As new fishing line 162 is reeled onto spool 158, it may be guided either by hand or with a tool (not shown) to ensure even disbursement thereon.

Figure 6:
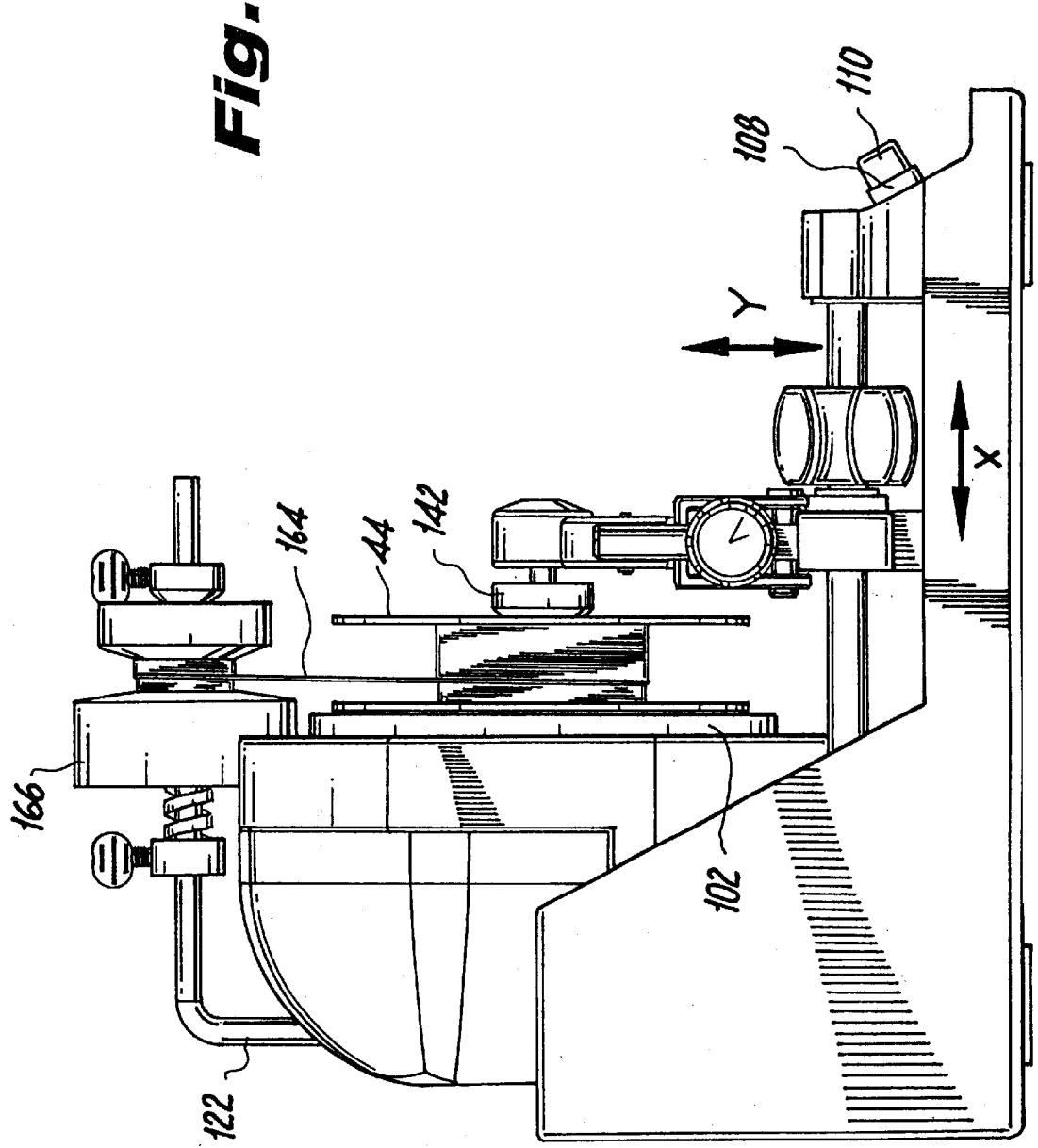
FIG. 6 is a side elevation view of a preferred embodiment of a line rewinder apparatus, similar to FIG. 5, showing a stripper spool mounted thereon for rewinding used fishing line from a spinning reel spool to the stripper spool.

Referring to FIG. 6, to strip used fishing line 164 from a spool 166 of a spinning reel, the stripper spool 44 is mounted between the exposed face of drive wheel 102 and centering cone 142 in a manner similar to that described above for mounting spool 158 as illustrated in FIG. 5. In addition, spool 166 is mounted on the service spool arm 122 in a manner similar to that described above for mounting spool 160 as illustrated in FIG. 5. The free end of the used fishing line 164 is tied to stripper spool 44 in preparation for winding it thereon.

To strip the used fishing line 164 from spool 166 and onto stripper spool 44, switch 108 is switched to the "reverse" position, i.e., for CCW rotation, and switch 110 is adjusted to rotate the drive wheel 102 at the desired rotational speed.

An alternative method for stripping used fishing line from a fishing reel with the present invention is to hold the fishing reel by hand, mount the stripper spool 44 between drive wheel 102 and centering cone 142 as described above and illustrated in FIG. 6, attach the free end of the used fishing line to stripper spool 44, and rotate the drive wheel 102 using switches 108 and 110 of control panel 20.

Referring to FIG. 7, a perspective view of another preferred embodiment of the line rewinder apparatus 10 is illustrated, wherein the sheet metal insert 25 that supports the major components of the apparatus 10 is disassembled from the base 12 (FIG. 1). It should be readily apparent that base 12 may be omitted and sheet metal insert 25 can be reformed to provide the sole support for the major components of the line rewinder apparatus 10 and thereby act as a base therefor.

The preferred embodiment includes a reel foot mounting assembly 168 for positioning a fishing reel in relation to the drive assembly 18 for rewinding line. In addition, the preferred embodiment includes a drive wheel assembly 169 for receiving and rotating a crank of a fishing reel or for clamping and rotating a spool.

The reel foot mounting assembly 168 includes truss shafts 46 and 48 spanning well 22 in parallel relationship to each other between the front raised portion 14 and rear raised portion 16. A truss 174, supported on shouldered bushings 170 and 172, moves on the truss shafts 46 and 48 in the X direction toward and away from the drive assembly 18.

Truss pins 176 and 178 each extend from an end of truss 174 and are in parallel relationship with each other. A reel bar 180 moves in the Y direction on truss pins 176 and 178.

Locking assemblies 182 and 184 function as locking devices for locking reel bar 180 to truss pins 176 and 178, and for locking truss 174 to truss shafts 46 and 48, respectively. Locking assembly 182 includes locking knob 183 and locking assembly 184 includes locking knob 185. Both locking assemblies 182 and 184 are identical in design and function, therefore only locking assembly 182 is described in detail below.

Figure 8:
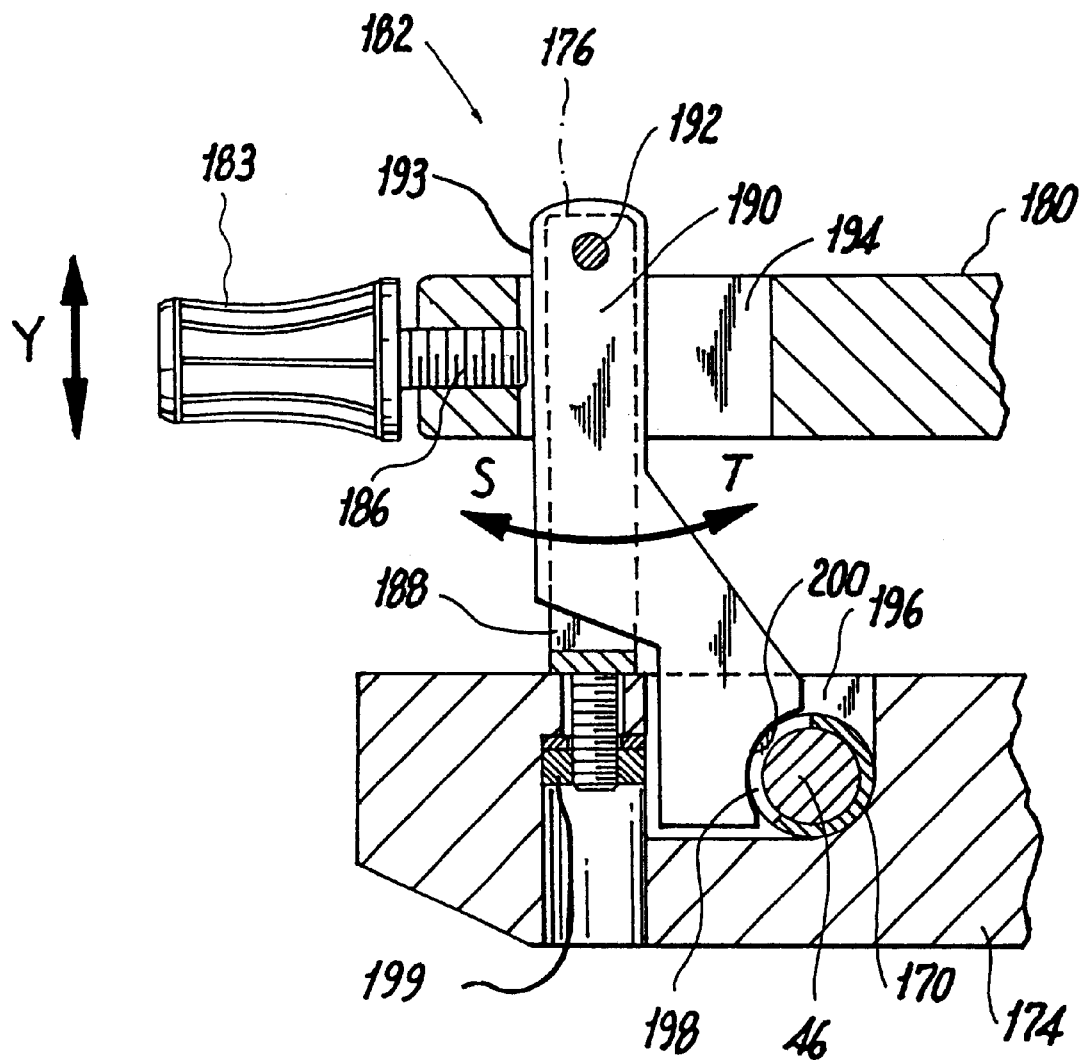
FIG. 8 is a partial sectional view, taken along line 8—8 of FIG. 7, showing the details of an embodiment of a locking assembly for locking the reel bar and truss in a predetermined position in relation to the base.

Referring to FIG. 8, locking assembly 182 includes a threaded pin 186 which is attached to the locking knob 183 and threadingly engaged with an end of reel bar 180. A slot 188 is provided in the upper portion of truss pin 176. A locking plate 190 slidingly fits within the slot 188 and is pinned with a dowel pin 192 to the upper end of the truss pin 176. The locking plate 190 can pivot in slot 188 about dowel pin 192 in the directions indicated by arrows "S" and "T". In addition, an edge 193 of locking plate 190 extends past the outside diameter of truss pin 176 so threaded pin 186 can contact the edge 193 without contacting truss pin 176.

Slots 194, 196, and 198 are formed in reel bar 180, truss 174, and shouldered bushing 170, respectively. Slot 194 provides clearance for locking plate 190 to pivot about dowel pin 192 and for reel bar 180 to clear the locking plate 190 when the reel bar 180 is moved in the Y direction. Slot 196 provides clearance for locking plate 190 to pivot about dowel pin 192 and slot 198 provides clearance for an edge 200 of locking plate 190 to contact the outside diameter of truss shaft 46. Truss pin 176 is attached to truss 174 with nut 199 so that truss pin 176 and locking plate 190 can be aligned with slots 194, 196, and 198.

To lock reel bar 180 to truss pin 176 and truss 174 to truss shaft 46, locking knob 183 is rotated to tighten threaded pin 186 against edge 193 of locking plate 190. As threaded pin 186 contacts edge 193, locking plate 190 rotates about dowel pin 192 in the direction indicated by arrow T until edge 200 contacts truss shaft 46. To unlock reel bar 180 from truss pin 176 and truss 174 from truss shaft 46, locking knob 183 is rotated to back threaded pin 186 away from edge 193 of locking plate 190. As threaded pin 186 is backed away from edge 193, locking plate 190 tends to rotate about dowel pin 192 in the direction indicated by arrow S and edge 200 releases truss shaft 46.

Referring to FIG. 7, rewinding new fishing line onto a fishing reel (not shown) is carried out in the manner similar to that described above and illustrated in FIG. 4. However, a different procedure is followed for adjusting reel foot mounting assembly 168 with respect to drive assembly 18. The procedure includes releasing locking assemblies 182 and 184 by loosening locking knobs 183 and 185, respectively. Thereafter, truss 174 is moved in the X direction away from the drive assembly 18.

In a manner similar to that described above for attaching a fishing reel to the reel rewinder assembly 10, the thumb screws 81 and 83 of foot clamps 80 and 82, respectively, are loosened and the foot clamps 80 and 82 are moved laterally outward away from the center of reel bar 180. The reel foot of a fishing reel is centered on top of reel bar 180 with its handle facing toward the drive assembly 18. Foot clamps 80 and 82 are moved laterally inward toward the fishing reel to capture each extended portion of the reel foot. Thumb screws 81 and 83 are tightened to secure the fishing reel in place.

To adjust the fishing reel so its handle is drivingly engaged with drive wheel assembly 169, reel bar 180 and truss 174 are moved in the Y direction and X direction, respectively, so that the axis of rotation of the fishing reel handle is as nearly congruent as possible with the axis of rotation of drive wheel assembly 169. After the fishing reel is in position, locking knobs 183 and 185 are tightened to retain the reel foot mounting assembly 168 in position. Winding fishing line onto the fishing reel is done in a manner similar to that described above and illustrated in FIG. 4.

Figure 9:
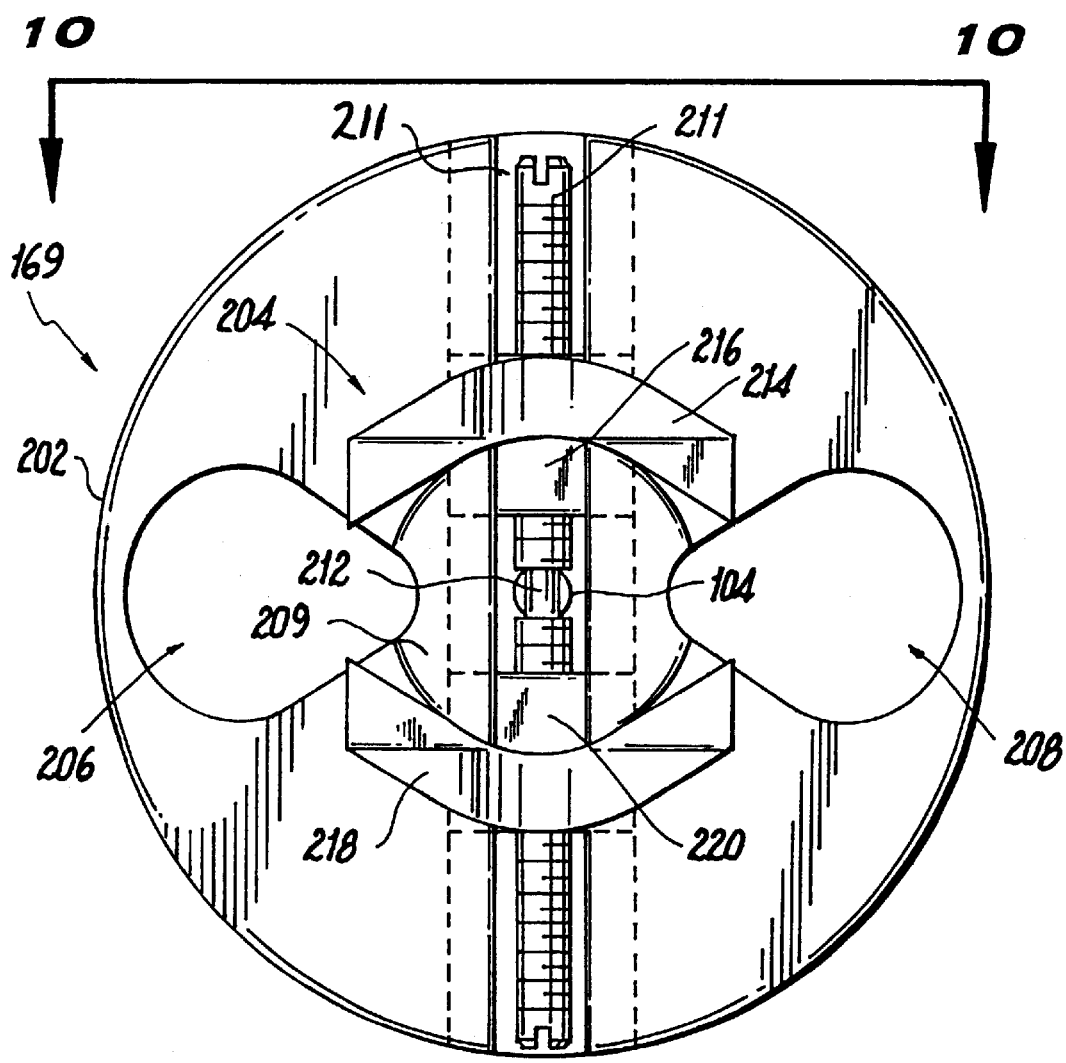
FIG. 9 is an elevation view, taken along line 9—9 of FIG. 7, showing the details of an embodiment of a drive wheel assembly.
Figure 10:
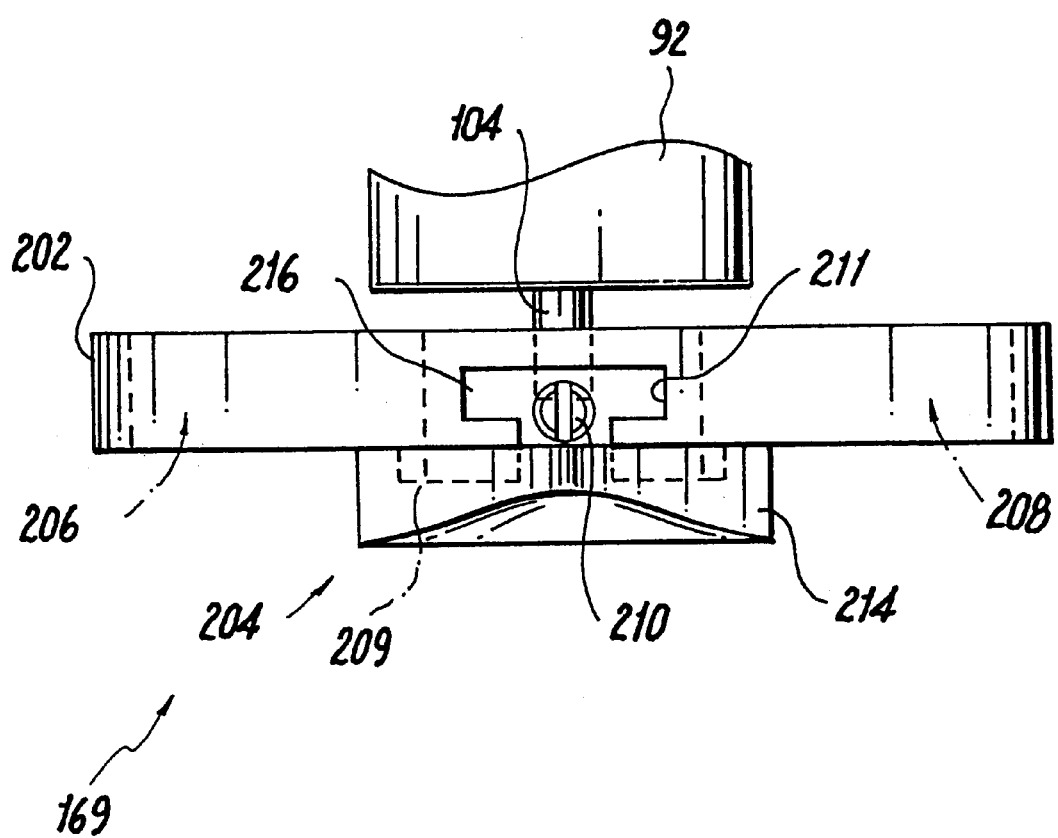
FIG. 10 is a plan view, taken along line 10—10 of FIG. 9, showing further details of the drive wheel assembly.

Referring to FIGS. 9 and 10, a preferred embodiment of the present invention includes the drive wheel assembly 169 for receiving and rotating a crank of a fishing reel, and for retaining a spool for rotation. The drive wheel assembly 169 includes a drive wheel 202 and a spool clamping assembly 204.

Drive wheel 202 is attached to drive shaft 104 of motor 92. Triangularly shaped apertures 206 and 208 are formed in drive wheel 202 for engaging handles of fishing reels. Other aperture geometries, for example, ovals, elongated holes, etc., may be used to accept the various types of fishing reel handles that are available on the market. In addition, other methods may be used to engage fishing reel handles, for example, removable dowel pins, clips, etc.

The center of drive wheel 202 includes a raised hub 209 to facilitate attaching small spools as described in more detail below. A T-shaped traveler guide 211 extends laterally across the face of drive wheel 202 facilitating attachment of spool clamping assembly 204. The drive shaft 104 of motor 92 extends into traveler guide 211.

The spool clamping assembly 204 includes a spindle 210 having a circumferential groove 212 which receives the end of drive shaft 104, thereby preventing the spindle 210 from moving in its axial direction. One end of the spindle 210 includes a left-hand thread while the opposite end includes a right-hand thread. Each end of the spindle 210 includes a tool fitting, such as slots for a flat head screw driver, to facilitate rotation of the spindle 210.

A first jaw 214 includes a T-shaped traveler 216 which is captured in the T-shaped traveler guide 211 and threadingly engaged with the left-hand thread of the spindle 210. Similarly, a second jaw 218 includes a T-shaped traveler 220 which is captured in the T-shaped traveler guide 211 and threadingly engaged with the right-hand thread of spindle 210. Those skilled in the art will recognize that the T-shaped traveler guide 211 and travelers 216 and 220 may have other cross-sectional shapes and still be in keeping with the present invention. For example, the cross-sectional shapes may instead be wedge shaped or circular.

The spool clamping assembly 204 operates as follows. Rotating the spindle 210 in a first direction causes jaws 214 and 218 move away from each other and rotating spindle 210 in a second direction causes jaws 214 and 218 to move toward each other. To secure a spool to drive wheel assembly 169, the spindle 210 is rotated in the first direction and a spool is positioned approximately in the center with, and flush against the face of the drive wheel 202. The spindle 210 is then rotated in the second direction to cause the jaws 214 and 218 to clamp the outside diameter of the spool in position. The raised hub 209 is usefull for limiting how deeply the jaws 214 and 218 grip small spools (which tend to have shorter skirts). This prevents jaws 214 and 218 from obstructing the spooling of line onto the small spools.

The inclusion of the spool clamping assembly 204 with drive wheel 202 provides several advantages. For example, it makes it unnecessary to include support arm assembly 136 (FIGS. 1 and 5) to support a spool against drive wheel assembly 169. This reduces the complexity of changing over from rewinding line directly onto a fishing reel to rewinding line onto a spool. In addition, spool clamping assembly 204 tends to maintain spools more accurately on the center of the drive wheel 202. Furthermore, including spool clamping assembly 204 allows one of the flanges of stripper spool 44 to be eliminated, thereby reducing the complexity of the stripper spool 44 and simplifying the removal of used fishing line therefrom.

In view of the foregoing description and the accompanying figures, the present invention provides an apparatus for conveniently and easily winding fishing line onto the spools of various types of fishing reels including, for example, bait casting reels, fly reels, and spinning reels. More specifically, the present invention readily accommodates various fishing reel configurations, for example, reels that are intended to be mounted to the top or bottom of a rod, reels that are intended for right-handed or left-handed fisherman, reels that have different geometries and spool drive configurations, etc. In addition, the present invention provides an apparatus which is highly portable and readily utilized in a shop or in the field.

It will be recognized by those skilled in the art that changes and/or modifications may be made to the above-described embodiments without departing from the concepts of the present invention. It is understood, therefore, that the invention is not limited to the particular embodiments which are disclosed, but is intended to cover all modifications and changes which are within the scope and spirit of the invention as defined by the appended claims.

What is claimed is:

1. An apparatus for transferring fishing line between a storage spool and a fishing reel spool comprising:
   a base;
   a motor supported on the base;
   a drive wheel driven by the motor and having a face portion;
   a truss supported on the base and mounted for movement toward and away from the face portion of the drive wheel;
   a reel bar supported on the truss and mounted for movement toward and away from the truss in a direction parallel with the face portion of the drive wheel; and
   foot clamps supported on the reel bar for securing a reel foot to the reel bar.

2. An apparatus as recited in claim 1, further comprising a locking assembly for locking the truss in a predetermined position in relation to the base.

3. An apparatus as recited in claim 1, further comprising a truss shaft mounted to the base for supporting the truss, and a collet sleeve mounted to the truss between the truss and the truss shaft.

4. An apparatus as recited in claim 3, further including a collet nut threadingly engaged with the collet sleeve for locking the truss to the truss shaft.

5. An apparatus as recited in claim 1, further comprising a locking assembly for locking the reel bar in a predetermined position in relation to the truss.

6. An apparatus as recited in claim 1, further comprising a truss pin mounted to the truss for supporting the reel bar, and a pin threadingly engaged with the reel bar for adjustment against the truss pin.

7. An apparatus as recited in claim 1, further comprising a locking assembly for locking the reel bar and the truss in a predetermined position in relation to the base.

8. An apparatus as recited in claim 1, further comprising a truss shaft mounted to the base and engaging the truss to guide the movement of the truss toward and away from the face portion of the drive wheel, and a truss pin mounted to the truss and engaging the reel bar to guide the movement of the reel bar toward and away from the truss in a direction parallel with the face of the drive wheel.

9. An apparatus as recited in claim 8, further comprising a locking plate pivotally mounted to the truss pin for lockingly engaging the truss shaft, and a pin threadingly engaged with the reel bar and adjustable to pivot the locking plate.

10. An apparatus as recited in claim 1, wherein the foot clamps are angled brackets mounted on the reel bar for movement along the length thereof.

11. An apparatus as recited in claim 10, wherein the angled brackets each include a pair of flanges that straddle the reel bar, and a clevis pin extends between the flanges of each angled bracket to capture the angled brackets to the reel bar.

12. An apparatus as recited in claim 1, wherein the drive wheel has an aperture extending through the face portion of the drive wheel.

13. An apparatus as recited in claim 12, wherein the aperture extending through the face portion of the drive wheel is triangularly shaped.

14. An apparatus as recited in claim 1, wherein the drive wheel includes a spool clamping assembly for clamping a spool.

15. An apparatus as recited in claim 1, further comprising a spindle rotatably mounted to the drive wheel and having a left-hand thread on a first end and a right-hand thread on a second end; a first jaw threadingly engaged with the left-hand thread of the spindle; and a second jaw threadingly engaged with the right-hand thread of the spindle.

16. An apparatus as recited in claim 15, wherein the drive wheel includes a traveler guide and the first and second jaws each include a traveler for mating with the traveler guide.

17. An apparatus as recited in claim 15, wherein the face portion of the drive wheel includes a raised hub.

18. An apparatus as recited in claim 1, further comprising a service spool arm extending from the base for supporting a spool.

19. An apparatus as recited in claim 18, wherein the service spool arm is relocatable between a left-hand position and a right-hand position to facilitate transferring fishing line onto spools of various fishing reel types.

20. An apparatus as recited in claim 1, further comprising a support arm assembly mountable to the reel bar with the foot clamps for supporting a spool against the face portion of the drive wheel.

21. An apparatus for transferring fishing line between a storage spool and a fishing reel spool comprising:
   a base;
   means for rotating the fishing reel spool;
   a truss supported on the base and mounted for movement in a direction parallel with the axis of rotation of the means for rotating;
   a reel bar supported on the truss and mounted for movement toward and away from the truss in a direction normal to the axis of rotation of the means for rotating; and a foot clamping assembly supported on the reel bar for securing a reel foot to the reel bar.

22. An apparatus as recited in claim 21, further comprising a locking assembly for locking the truss in a predetermined position in relation to the base.

23. An apparatus as recited in claim 21, further comprising a truss shaft mounted to the base for supporting the truss and having its axis parallel to the axis of rotation of the means for rotating, and a collet sleeve mounted to the truss between the truss and the truss shaft.

24. An apparatus as recited in claim 23, further including a collet nut threadingly engaged with the collet sleeve for locking the truss to the truss shaft.

25. An apparatus as recited in claim 21, further comprising a locking assembly for locking the reel bar in a predetermined position in relation to the truss.

26. An apparatus as recited in claim 21, further comprising a truss pin mounted to the truss and extending through the reel bar, and a pin threadingly engaged with the reel bar for adjustment against the truss pin.

27. An apparatus as recited in claim 21, further comprising a locking assembly for locking the reel bar and the truss in a predetermined position in relation to the base.

28. An apparatus as recited in claim 21, further comprising a truss shaft mounted to the base for guiding the truss in a direction parallel with the axis of rotation of the means for rotating, and a truss pin mounted to the truss for guiding the reel bar toward and away from the truss in a direction normal to the axis of rotation of the means for rotating.

29. An apparatus as recited in claim 28, further comprising a locking plate pivotally mounted to the truss pin for lockingly engaging the truss shaft when pivoted, and a pin threadingly engaged with the reel bar and adjustable to pivot the locking plate.

30. An apparatus as recited in claim 21, wherein the foot clamping assembly includes an angled bracket mounted to the reel bar for movement along the length thereof.

31. An apparatus as recited in claim 30, wherein the angled bracket includes a pair of flanges that straddle the reel bar, and a clevis pin extends between the flanges to capture the angled bracket to the reel bar.

32. An apparatus as recited in claim 21, wherein the means for rotating includes a means for engaging a handle of a fishing reel.

33. An apparatus as recited in claim 21, wherein the means for rotating includes a clamping means for clamping a spool.

34. An apparatus as recited in claim 21, further comprising a spindle rotatably mounted to the means for rotating and having a left-hand thread on a first end and a right-hand thread on a second end; a first jaw threadingly engaged with the left-hand thread of the spindle; and a second jaw threadingly engaged with the right-hand thread of the spindle.

35. An apparatus as recited in claim 34, wherein the means for rotating includes a traveler guide and the first and second jaws each include a traveler for mating with the traveler guide.

36. An apparatus as recited in claim 21, further comprising a service spool arm extending from the base for supporting a spool.

37. An apparatus as recited in claim 36, wherein the service spool arm is relocatable between a left-hand position and a right-hand position to facilitate transferring fishing line onto the spools of various fishing reel types.

38. An apparatus as recited in claim 21, further comprising a support arm assembly securable to the reel bar with the foot clamping assembly for supporting a spool in contacting relationship with the means for rotating.

39. An apparatus for transferring fishing line between a storage spool and a fishing reel spool comprising:

a base;

a motor supported on the base;

a drive wheel driven by the motor and having a face portion;

a first jaw adjustably mounted to move laterally across the face portion of the drive wheel;

a second jaw adjustably mounted to move laterally across the face portion of the drive wheel and aligned with the first jaw to secure a first spool in the center of the face portion; and a service spool arm extending from the base to support a second spool for feeding fishing line to the first spool mounted on the drive wheel.

40. An apparatus as recited in claim 39, further comprising a spindle rotatably mounted to the drive wheel and having a left-hand thread on a first end and a right-hand thread on a second end; and wherein the first jaw threadingly engages with the left-hand thread of the spindle and the second jaw threadingly engages with the right-hand thread of the spindle.

41. An apparatus as recited in claim 39, wherein the drive wheel includes a traveler guide formed therein and the first and second jaws each include depending from them a traveler for mating with the traveler guide.

42. An apparatus as recited in claim 39, wherein the face portion of the drive wheel includes a raised hub.

43. An apparatus as recited in claim 39, further comprising a truss supported on the base and mounted for movement toward and away from the face portion of the drive wheel, and a reel bar supported on the truss and mounted for movement toward and away from the truss in a direction parallel with the face portion of the drive wheel.

44. An apparatus as recited in claim 43, further comprising a truss shaft mounted to the base for guiding the truss toward and away from the face portion of the drive wheel, a truss pin mounted to the truss for guiding the reel bar toward and away from the truss in a direction parallel with the face portion of the drive wheel, and at least one locking assembly for locking the reel bar and the truss in a predetermined position in relation to the base.

45. An apparatus as recited in claim 44, wherein the at least one locking assembly includes a locking plate pivotally mounted to the truss pin for lockingly engaging the truss shaft when pivoted, and a pin threadingly engaged with the reel bar and adjustable to pivot the locking plate.

46. An apparatus as recited in claim 43, further including an angled bracket mounted on the reel bar for movement along the length thereof.

47. An apparatus as recited in claim 46, wherein the angled bracket includes a pair of flanges that straddle the reel bar, and a clevis pin extends between the flanges to capture the angled bracket to the reel bar.

48. An apparatus as recited in claim 39, wherein the service spool arm is moveable between a left-hand position and a right-hand position to facilitate transferring fishing line onto spools of various fishing reel types.

49. An apparatus as recited in claim 39, wherein the drive wheel includes an aperture extending through the face portion of the drive wheel.

50. An apparatus as recited in claim 49, wherein the aperture extending through the face portion of the drive wheel is triangularly shaped.

* * * * *